United States Patent [19]

Fuller

[11] Patent Number: 4,826,512

[45] Date of Patent: May 2, 1989

[54] SELF-CLEANING AIR FILTER

[76] Inventor: Carmel U. Fuller, Rte. 1, Box 480, Haysi, Va. 24256

[21] Appl. No.: 259,726

[22] Filed: Oct. 19, 1988

[51] Int. Cl.$^4$ .......................................... B01D 46/00
[52] U.S. Cl. ...................................... 55/283; 55/290; 55/302; 55/429
[58] Field of Search .................. 55/290, 302, 283, 429

[56] References Cited

U.S. PATENT DOCUMENTS

| | | | |
|---|---|---|---|
| 1,002,618 | 9/1911 | Winkler | 55/290 |
| 1,995,648 | 3/1935 | Rathbun | 55/294 |
| 2,559,428 | 7/1951 | Hersey, Jr. | 55/294 |
| 2,765,048 | 10/1956 | Hersey, Jr. | 55/294 |
| 2,795,291 | 6/1957 | Pierce | 55/290 |
| 2,827,128 | 3/1958 | Hersey, Jr. | 55/283 |
| 3,212,239 | 10/1965 | Maestrelli | 55/290 |
| 3,339,347 | 9/1967 | Otto, Jr. | 55/290 |
| 3,360,907 | 1/1968 | Clark, Jr. et al. | 55/283 |
| 3,402,881 | 9/1968 | Moore et al. | 415/47 |
| 4,482,365 | 11/1984 | Roach | 55/290 |
| 4,622,050 | 11/1986 | O'Connor | 55/290 |

Primary Examiner—Bernard Nozick
Attorney, Agent, or Firm—Munson H. Lane, Jr.

[57] ABSTRACT

A self-cleaning air filter includes a tubular housing and an annular filter cartridge removably and rotatably supported in the tubular housing. A removable cover at one end of the housing provides access to the housing for insertion and removal of the filter cartridge. A first rotary support for one end of the filter cartridge is mounted on the removable cover and includes a short shaft supported by the cover and a hub assembly rotatably mounted on the short shaft. The hub assembly is releasably secured to one end of the filter cartridge. A pair of successively smaller diameter tubular extensions are provided at the other end of the housing through which clean air passes outwardly from the filter. A second rotary support for the filter cartridge includes a turntable mounted inside of the housing by a tubular neck which is journaled inside of the first tubular extension. The turntable has a peripheral flange which snugly engages the other end of the filter cartridge with a friciton fit. An air nozzle having a narrow elongated slot is adjustably supported inside of the filter cartridge to direct air radially outwardly through the cartridge for back flushing same when the cartridge is rotated. The nozzle is biased toward the inside surface of the filter cartridge. A motor is drivingly connected with either of the first and second rotary supports for rotating the air filter cartridge.

18 Claims, 3 Drawing Sheets

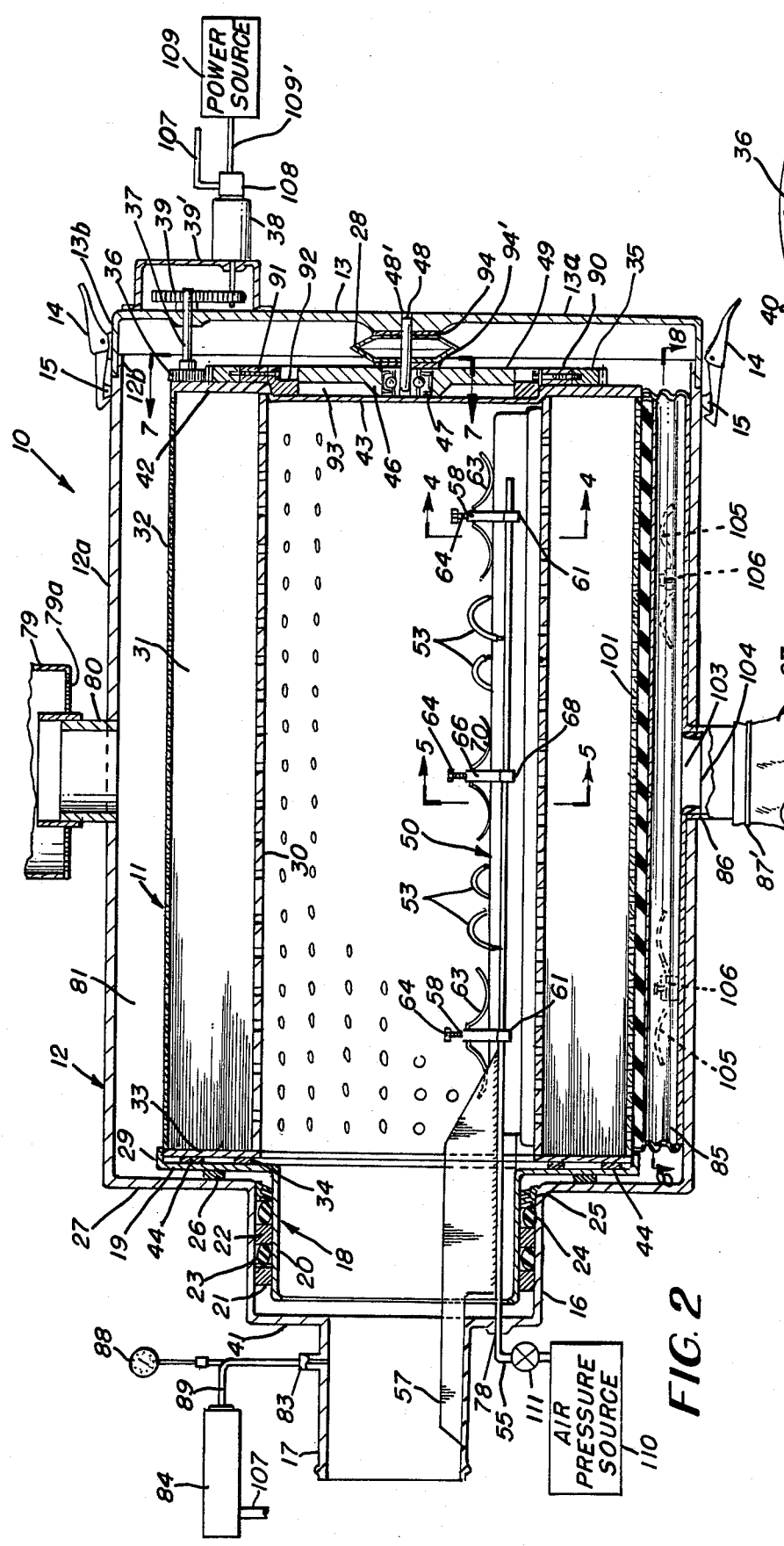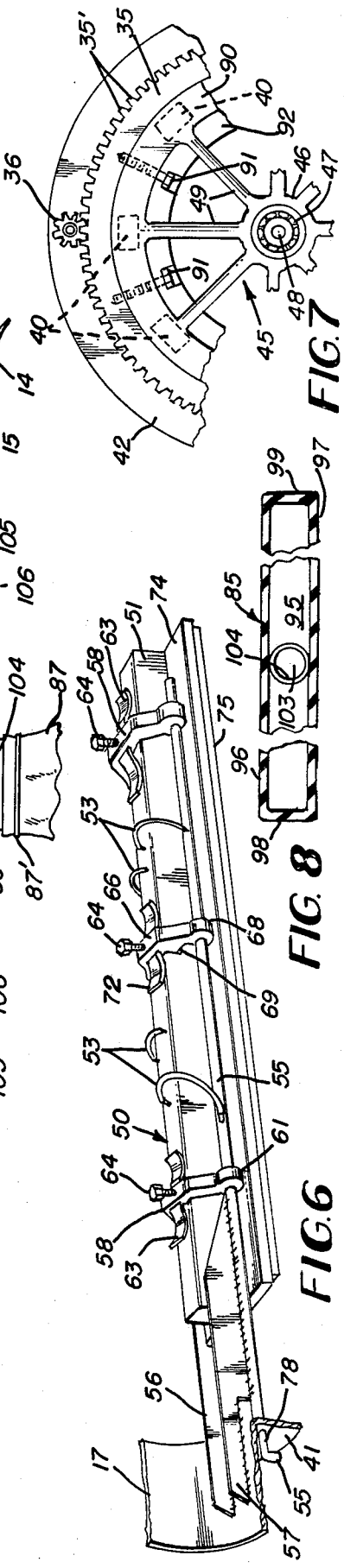

SELF-CLEANING AIR FILTER

FIELD OF THE INVENTION

The present invention relates generally to an air filter and more particularly to a self-cleaning air filter.

BACKGROUND OF THE INVENTION

The need for supplying clean air to the air intake of internal combustion engines requires the use of air filters. Where the internal combustion engine is operating in a dust laden environment, air filters become clogged very rapidly and must either be replaced by a new filter or cleaned of the dust which clogs the filter. To shut down an engine in order to replace the dirty filter with a new filter, or to remove and clean the dirty filter and then to replace the cleaned filter takes valuable time during which the machine operated by the engine and the engine operator are unable to perform the function for which they are primarily intended. In order to avoid shutting down the engine, operators often will allow the engine to run with a dirty air filter longer than it should, thereby resulting in inefficient engine use.

If the air filter can be cleaned periodically or continuously while it continues to filter the air supply to the engine, substantial economy can be obtained by reducing the down time of the engine and by reducing the frequency of filter replacement.

The need for means to periodically or continuously clean an air filter while it performs its primary function has long been recognized and many devices have been developed to meet the need. The devices developed have met with varying degrees of commercial success but the fact that there are many internal combustion engines at the present time which operate without a self-cleaning air filter suggests that the need is not being fully met.

It is an object of the present invention to provide an improved self-cleaning air filter which provides for periodic, or continuous back flushing of successive portions of the air filter while the remainder of the air filter which is not being back flushed continues to filter the air supply. Dirt removed by the back flushing operation is discharged from the filter housing without recontamination of the filter or the air being treated by the filter.

It is a further object of the invention to provide a self-cleaning air filter which utilizes commercially available cylindrical air filter cartridges and a cylindrical filter housing having a readily removable cover at one end permitting rapid insertion of the filter cartridge therein and a rapid removal of the filter cartridge therefrom.

SUMMARY OF THE INVENTION

The invention is a self-cleaning air filter comprising a cylindrical air filter cartridge and a cylindrical filter housing in which the filter cartridge is removably and rotatably mounted. The filter cartridge is of conventional structure having a perforated central tube, an annular filter media surrounding the central tube, an outer foraminous member surrounding the filter media and a pair of end caps secured to opposite ends of the filter cartridge. One end cap entirely closes one end of the filter cartridge, while the other end cap has a central opening coaxial with the central tube. The filter housing has a readily removable cover at one end providing access into the housing for insertion and removal of the filter cartridge, and a pair of coaxial cylindrical extensions projecting outwardly from the other end of the housing in series of decreasing diameter and providing a clean air outlet from the filter housing.

A turntable is rotatably mounted in the housing adjacent to the outlet for rotatably supporting one end of the filter cartridge. The turntable includes a flat circular plate having a central opening, and a tubular stem coaxial with the central opening. The tubular stem is rotatably mounted in the first extension of the housing with the circular plate inside of the housing and spaced from the outlet end by an annular wear seal. The removable cover has a stub shaft mounted centrally therein providing support for a circular ring or disk which is rotatably and slidably mounted thereon. The disk fits snuggly in a central recess in the closed end cap of the filter cartridge and provides rotatable support therefor. A compression spring is mounted about the stub shaft between the cover and the disk to bias the disk and filter cartridge against the turntable at the opposite end of the filter housing. A ring gear may be drivingly connected to either the turntable or to the support ring or disk at the opposite end of the housing which when driven by appropriate drive means, rotates the filter cartridge. It is preferred to mount the ring gear on the turntable where it will be driven by drive means including a drive shaft extending through the outlet end of the housing and a pinion gear mounted on the shaft which engages the ring gear. The drive shaft is preferably driven by an electric or fluid motor through appropriate reduction gearing to rotate the filter cartridge at the desired speed. Instead of a motor, the drive shaft may be manually driven by a crank and remote cable drive accessible to an operator. When an electric or fluid motor is used to rotate the filter cartridge, the motor is preferably operated periodically by automatic controls responsive to variations in pressure differential between ambient pressure and the pressure at the outlet of the filter. When the pressure differential increases to a predetermined value, the pressure sensor will actuate the motor control to turn the motor on. The motor will cut off when the pressure differential decreases below a predetermined level or after a predetermined time.

For back flushing the filter cartridge while the filter cartridge is rotating, an elongated air supply nozzle is supported inside of the central tube of the filter cartridge by cantilever supports mounted in the second tubular extension for directing pressurized air from an air supply through a narrow segment of the filter cartridge. Outside of the filter cartridge opposite the air nozzle, a dust collecting boot is provided for collecting the dust back flushed from the filter and discharging it outside of the housing, preferably into a collection bag or other dust receptacle. The air nozzle is spring biased from its support toward the inside surface of the central tube of the filter cartridge and a resilient pad, or seal, having an elongated slot coextensive with the nozzle outlet is interposed between the nozzle and the central tube.

The dust collection boot is a narrow, elongated rectangular cross-sectioned receptacle of plastic or other flexible material which has a bottom and bellows-type side and end walls which expand to fill the gap between the inside surface of the filter housing, against which the bottom of the boot rests, and the outside surface of the filter cartridge opposite the air nozzle. A resilient pad or seal supported by a metal pad holder is interposed between the dust collecting boot and the filter cartridge.

Both the pad and pad holder have a longitudinal slot therein through which the air from the nozzle passes into the boot carrying with it the dust collected on the exterior of the filter. The pad and pad holder are spring biased against the exterior surface of the filter cartridge by springs interposed between the inside of the filter housing and the pad holder. The top of the boot and pad holder are connected with an air tight seal. The bottom of the boot has a discharge opening communicating with the dust discharge opening in the filter housing through a collar fitted therein. A dust collecting bag may be secured to the collar outside of the housing, or in some situations, the dust collected by the boot may be passed from the housing into the atmosphere.

BRIEF DESCRIPTION OF THE DRAWINGS

With the foregoing objects and features in view and such other objects and features as may become apparent as this specification proceeds, the invention will be understood from the following description taken in conjunction with the accompanying drawings wherein like characters of reference are used to designate like parts and wherein:

FIG. 2 is a longitudinal cross-sectional view of the apparatus shown in FIG. 1;

FIG. 6 is a perspective view of the air nozzle and associated support assembly for back flushing the filter cartridge;

FIG. 7 is a fragmentary end view of the right-hand end of the filter cartridge and drive mechanism therefor taken on lines 7—7 of FIG. 2;

FIG. 8 is a fragmentary horizontal section through the dust collection boot taken on lines 8—8 of FIG. 2;

DETAILED DESCRIPTION OF THE INVENTION

Figure 1:
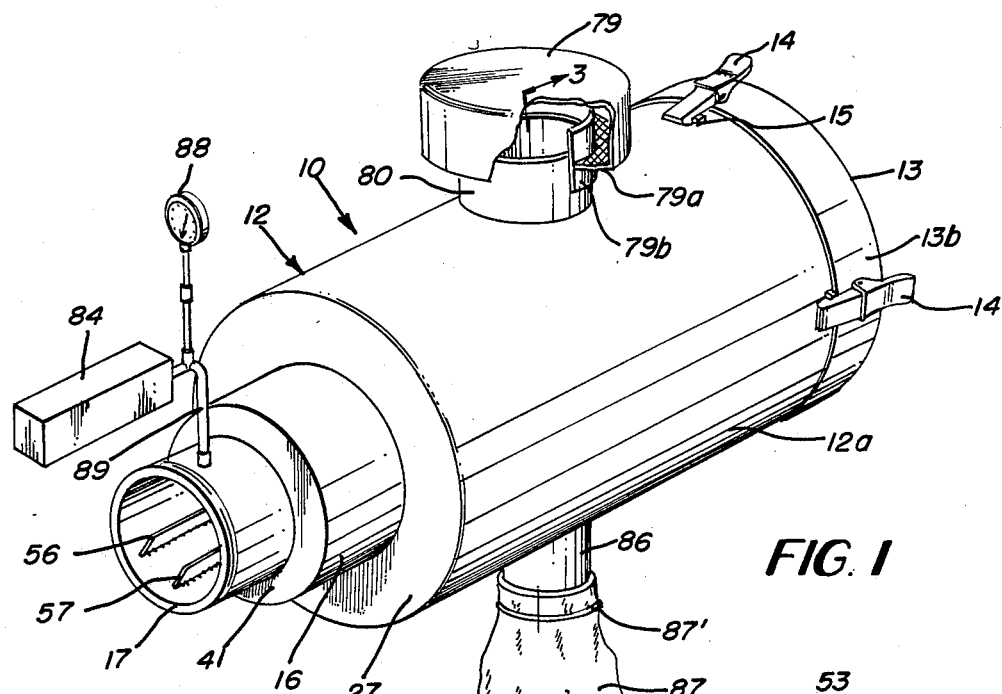
FIG. 1 is a perspective view of one embodiment of the invention.
Figure 3:
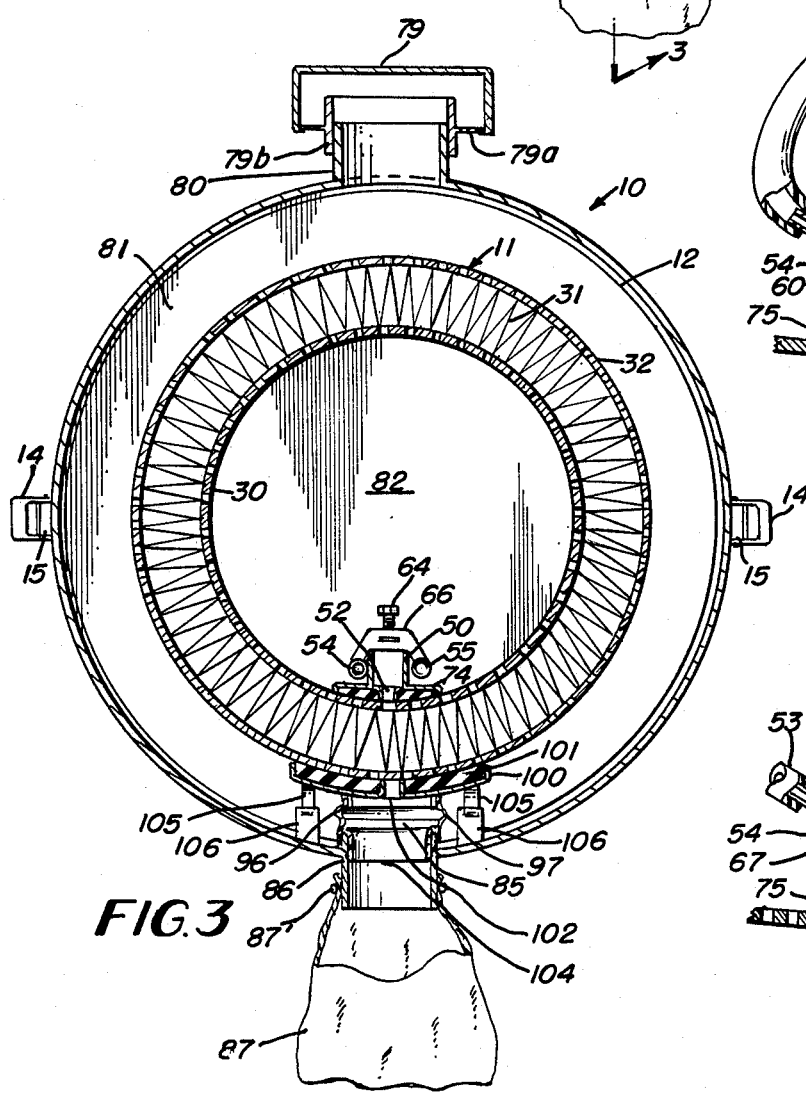
FIG. 3 is a vertical section taken on lines 3—3 of FIG. 1.
Figure 4:
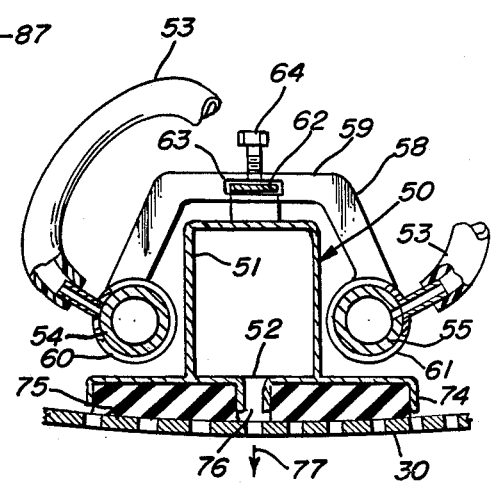
FIG. 4 is a vertical section taken on lines 4—4 of FIG. 2.
Figure 5:
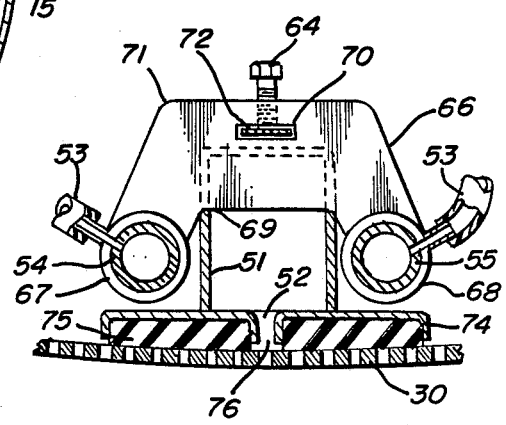
FIG. 5 is a vertical section taken on lines 5—5 of FIG. 2.

Referring now to the drawings and particularly to FIGS. 1 through 8, one embodiment of the self-cleaning air filter of the subject invention is indicated generally by the numeral 10. The self-cleaning air filter 10, best seen in FIGS. 1, 2 and 3, comprises a standard commercial air filter cartridge 11 which is rotatably and removably received within an external housing 12.

The housing 12 comprises a generally cylindrical main body portion 12a having at one end 12b a removable cover 13, and at its other end first and second reduced diameter tubular extensions 16 and 17 respectively. The extension 16 is connected at one end with the housing body 12a by an annular end wall portion 27 and it is connected at its other end to the extension 17 of lesser diameter by a transverse annular end wall portion 41. The extensions 16 and 17 provide a passage for filtered air from the filter to the intake of an internal combustion engine (not shown), or other device requiring filter air.

The end cover 13 is an end cap comprising a circular end wall 13a and a cylindrical body portion 13b which telescopes over the end portion 12b of the housing body 12. Toggle clamps 14 mounted on the exterior of the cylindrical body portion 13b of the end cap 13 engage lugs 15 mounted on the exterior of the housing body 12a to releasably secure the cover 13 in place on the housing 12. Removal of the cover 13 by release of the toggle clamps 14 from the lugs 15 provides easy access to the interior of the housing 12 for easy and quick insertion and removal of a filter cartridge 11.

As seen in FIG. 2, a turntable 18 is rotatably mounted within the housing 12 opposite the housing end 12b. The turntable 18 comprises a flat annular plate 19 which is open at its center and a cylindrical neck 20 extending coaxially outwardly from the inner circumference of the annular plate 19. The neck 20 is rotatably supported coaxially within the housing extension 16 by longitudinally spaced bearing rings 21 and 22 between which an O-ring seal 23 is mounted. A double lip seal 25, secured within the extension 16 adjacent its inner end, bears against the outer surface of the cylindrical neck 18 to prevent dirt from entering the extension 16 from the housing 12. A second O-ring 24 is mounted within the extension 16 between the bearing ring 22 and the double lip seal 25 as a further seal against dirt and air flow. The annular plate 19 is spaced from the inner surface of the housing end wall 27 by a thrust bearing ring 26 of Teflon or other antifriction material secured to the inner surface of the end wall 27 by adhesive or other suitable means. The turntable 18 is freely rotatable within the housing 12 with a minimum of friction. An annular flange 29 extends longitudinally inwardly from the outer circumference of the annular plate 19. Its inner diameter is sufficient so that the flange snuggly receives within its perimeter the inner end of the filter cartridge 11 with a friction fit. The turntable 18 is preferably made of thin metal of sufficient rigidity and durability to support the filter 11 as it rotates. The flange 29 is preferably resiliently biased radially inwardly to frictionally engage the outer surface of the filter 11. A seal ring 34 is secured to the inner face of the turntable plate 19 to provide an air seal between the turntable and the inner end plate or cap 33 of the filter cartridge 11.

The filter 11 is preferably a standard commercial air filter cartridge which includes an inner perforated tube 30 surrounded by an annular filter body 31 of seleced filter media, such as longitudinally convoluted or pleated filter paper or other suitable air filter material, and an outer screen or perforated tube 32. An annular end plate 33 is affixed to the discharge end of the filter cartridge and a circular end plate 42 having a circular central recessed portion 43 is affixed to the opposite end of the filter cartridge. The circular recessed portion 43 fits snuggly within the end of the central perforated tube 30 at the end opposite the discharge end to provide an airtight closure therefor.

The filter cartridge 11 is inserted within the body of the housing 12 with the cover 13 removed and is pushed inward until the discharge end of the cartridge is seated against the turntable 18 within the flange 29.

The annular end plate 33 and circular end plate 42 at the opposite ends of the filter cartridge are preferably made of ferrous metal capable of being magnetically attracted. A plurality of permanent magnets 44 are circularly arranged outwardly of the seal 34 on the turntable end plate 19. The magnets 44, adhesively or otherwise suitably secured to the inner face of the turntable, attract the end plate 33 and firmly hold the filter cartridge against the turntable.

For the purpose of rotating the filter cartridge 11 within the housing 12, a ring gear 35 and hub assembly 45 are detachably secured to the circular end plate 42. The hub assembly 45 includes a central hub 46 with a radial bearing 47 therein for rotatably receiving a short shaft 48. Radial arms 49 extending outwardly from the hub 46 are secured to an outer ring 90. The ring gear 35 is mounted outwardly of the outer ring 90 by screw fasteners 91 extending radially outwardly, through suitable holds in the outer ring 90, into the ring gear 35. A central locator ring 92, integral with or formed separate from the outer ring 90 fits snugly into the central recess 93 of the central recess portion 43 of the filter cartridge end plate 42. A plurality of permanent magnets 40 may optionally be recessed within the outer ring 90, to provide a magnetic force of attraction to the metal end plate 42 for detachably holding the ring gear 35 and its hub assembly securely against the end plate 42.

The ring gear 35 is adapted to be rotated by a pinion gear 36 in mesh therewith. The pinion gear is driven by a small motor 38, either electric or fluid powered, through a reduction gear assembly 39. The motor 38 is shown in FIG. 2 as being mounted outside of the cover 13 on top of a reduction gear housing 39' secured to the cover 13. A shaft 37 from the reduction gear assembly 39 extends through an aperture in the cover 13 for driving the pinion gear 36.

One end of the short shaft 48 is fixed in a central aperture 48' in the cover 13. The other end of the shaft 48 is adapted to be slidably received within the radial bearing 47 of the hub assembly 45 to which the ring gear 35 is secured.

Either before or after the filter cartridge 11 is inserted into the housing 12, as previously described, the ring gear 35 and hub assembly 45 are mounted on the end plate 42 of the filter cartridge. The cover 13 to which the motor 38, reducing gear assembly 39, shaft 37 and pinion gear 36 are attached is telescoped over the end 12b of the housing 12. The pinion gear 36 becomes engaged with the ring gear 35 for driving same and the short shaft 48 is received within the bearing 47. A belleville spring 28, or other compression spring means such as a coil spring (not shown) surrounding the short shaft 48 between the cover 13 and the hub assembly 45 presses the filter cartridge inwardly against the turntable 18. Once the shaft 48 is properly received in the bearing 47 and the pinion gear is properly engaged with the teeth 35' of the ring gear 35, the cover 13 is latched in place by means of the toggle latches 14 on the cover 13 engaging the lugs 15 on the outside of the housing 12. Wear washers 94 and 94' positioned on opposite sides of the belleville spring 28 surrounding the shaft 48, serve as bearing surfaces between the spring 28 and the cover 13 and the hub 46 respectively.

With the cover 13 latched in place on the end of the housing 12, the force of the spring 28 exerted upon the hub assembly 45 normally presses the hub assembly into contact with the filter cartridge 11 with sufficient frictional force between the hub assembly and the end cap 42 so that when the motor 38 rotates the ring gear 35, the filter cartridge 11 is rotated without slippage taking place between the hub assembly and the filter cartridge. The use of the permanent magnets 40 for providing additional force to hold the ring gear and hub assembly 45 to the metal end plate 42 is optional depending upon how much torque is required to turn the filter cartridge 11 on the turntable 18 and how much torque is required to overcome the force of friction existing between the hub assembly 45 and the end cap 42. If the torque required to turn the filter cartridge on the turntable 18 is less than the torque required to overcome the frictional forces existing between the hub assembly 45 and the end plate 42, the permanent magnets 40 are unnecessary. On the other hand, if the filter cartridge 11 is large and heavy, requiring considerable torque from the motor 38 to turn it, then the permanent magnets 40 or other suitable means for releasably holding the ring gear 35 and hub assembly 45 to the end plate 42 may be required.

Various means for releasably securing a ring gear and hub assembly on the end cap 42 of the filter cartridge 11 may be used within the scope of the invention and it is not intended to limit the invention to the means shown. Another option (not shown) is, for example, a unitary ring gear and hub assembly where the hub assembly comprises a circular disk having a central circular boss fitting snugly in the recess 43 of end plate 42, a central aperture through the disk with a bearing bushing therein for rotatably mounting the disk on the short shaft 48, and with external gear teeth formed at the outer periphery of the disk for engagement with pinion gear 36.

If desired, the pinion gear 36 may be driven manually by a hand crank and remote cable connection (not shown) using appropriate gears to provide the desired speed of rotation of the filter for each revolution of the hand crank.

A longitudinally extending air nozzle 50 is adjustably mounted inside of the filter cartridge 11 adjacent the inner surface of the perforated tube 30. The air nozzle 50 is a generally rectangularly cross-sectioned tube 51 having a narrow slot 52 extending longitudinally along one side facing the inner surface of the filter tube 30. A plurality of flexible air inlet conduits 53 extend from the nozzle 50 on the opposite side thereof from the slot 52 and connect with air supply pipes 54 and 55.

The nozzle 50 is supported within the filter tube 30 by longitudinally extending pipes 54,55 which provide air to the nozzle 50. The pipes 54 and 55 are supported by longitudinally extending short metal brackets 56,57 each having one end welded inside of the end extension 17 of the housing and their other end welded to the outside surface of the pipes 54,55 respectively. The brackets 56,57 are thin plates which extend radially to the surfaces of the extension 17 and pipes 54 and 55.

Front and rear end brackets 58 of generally U-shape with sleeves 60,61 mounted on their opposite ends straddle the nozzle 50 and are supported by pipes 54,55 which extend through the sleeves 60,61. The bridge portion 59 of the brackets 58 have slots 62 extending therethrough in which are mounted leaf springs 63 which bear against the back side of the nozzle 50. Set screws 64 extending through threaded holes in the bridge portion 59 of the respective brackets secure the leaf springs 63 in the slots 62.

A center bracket 66, also of generally U-shape but with shorter arms than the front and rear end brackets 58 has sleeves 67 and 68 welded at its opposite ends. The bracket 66 is a flat plate which is received in the rectangular slot 69 in the back of the nozzle 50. A slot 70 extends through the bridge 71 of the center bracket 66 for receiving a leaf spring 72. The leaf spring 72 is secured in the slot of bracket 66 by a set screw 64.

The side of the air nozzle 50 facing radially outwardly toward the perforated filter tube 30, as seen in FIGS. 2, 4, 5 and 6 has a rectangular pad holder 74 formed thereon in which is mounted a resilient pad 75. The pad 75 is of rectangular shape and is provided with a longitudinal slot 76 coextensive with the slot 52 of the nozzle 50. The pad 75 bears against the surface of the perforated tube 30 and provides a continuous seal surrounding the nozzle air slot 52.

The leaf springs 63 and 72 supported by the brackets 58 and 66 respectively bear against the back of the nozzle tube 51 and yieldably urge the nozzle radially outwardly toward the inside surface of the perforated filter tube 30. The resilient pad 75 interposed between the nozzle tube 50 and the perforated filter tube 30 forms an air seal therebetween limiting air flow from the nozzle to flow in a radial direction indicated by arrow 77, from the slot 52 through the filter tube 30 and outwardly through the filter media 31 and outer tube 32. As it passes outwardly through the filter, the air supplied by the nozzle 50 back flushes the filter cartridge 11 in a narrow strip adjacent to the slot 52.

The provision for radial adjustment of the nozzle relative to the filter tube 30 is important to assure a good air seal between the nozzle and the filter tube 30. The adjustability of the nozzle permits the nozzle to accommodate filter tubes 30 of slightly different diameters and of imperfect concentricity while still maintaining a good air seal between the nozzle and the filter tube.

As seen in FIGS. 2 and 6, the end of the air pipe 55 extends outwardly through a sealed aperture 78 in the end wall 41 of the housing extension 16. Similarly, the end of air pipe 54, although hidden from view, also extends outwardly through the end wall 41.

The air lines 54 and 55 are each connected outside of the filter 10 to a source of pressurized air 110 through a control valve 111 (see FIG. 2).

A dust collection boot, or receptacle 85 is positioned opposite the air nozzle 50 in the annular space 81 between the filter cartridge 11 and the housing. The boot 85 is an elongated rectangularly cross-sectioned flexible plastic receptacle having a rectangular bottom 95 with bellows type expandable side walls 96, 97 and end walls 98,99 connected to and extending upwardly from the bottom 95. The top edges of the boot 85 are sealed with respect to the back side of a metal holder 100 for a resilient pad 101. An elongated slot 102 extends through the pad 101 and pad holder 100 opposite to the nozzle slot 52. A central hole 103 in the bottom of the boot 85 is fitted with a collar 104 extending downwardly inside the housing outlet port 86 through which dust and air collected in the boot 85 is discharged.

The pad holder 100 and pad 101 are biased against the outer surface of the outer filter tube 32 by leaf springs 105 which are supported in brackets 106 welded inside of the housing 12 on opposite sides of the boot 85. Two longitudinally spaced leaf springs 105 and brackets 106 are shown in FIG. 2 by hidden lines. The pad 101 is pressed against the outer filter tube 32 with only sufficient force to provide close contact between the pad and tube 32 without causing excessive drag upon the filter cartridge 11 while it is rotating.

In operation, the extension end 17 of the self-cleaning air filter will be connected to the air intake of an internal combustion engine (not shown). The vacuum created in the air intake of the engine creates a pressure differential between the air intake port 80 and the air outlet port 17 of the self-cleaning filter 10, causing air from the atmosphere to pass into the filter intake port 80 through the intake filter cup 79, and into the annular space 81 between the filter housing 12 and the filter cartridge 11. The dirty atmospheric air in the space 81 passes radially inwardly through the filter cartridge outer tube 32, the filter media 31 and inner filter tube 30 into the central space 82 inside the filter tube 30 from whence it passes axially outwardly from the filter through the extensions 16 and 17. In passing through the filter media 31, the air deposits dust and dirt particles on the surfaces of the filter media in the usual manner.

As dirt builds up on the surfaces of the filter media, the air passages through the filter media become clogged, reducing the air flow through the filter cartridge until eventually the air flow is insufficient for efficient engine operation. A pressure sensor 84, which is connected to a pressure sensor port 83 in the extension 17, will detect when the air flow through the filter cartridge is reduced to a predetermined flow which indicates that the filter cartridge needs to be back flushed. The pressure sensor 84 will send control signals through control line 107 to motor controller 108 for energizing and deenergizing the motor 38. A power source 109 is connected to the motor 38 through conduit 109' and the motor controller 108. Depending upon whether the motor 38 is an electric motor or a fluid motor, the power source will be either an electric or fluid power source.

Energizing the motor 38 causes the motor to turn the filter cartridge through the speed reducer assembly 39, the pinion gear 36 and ring gear 35 which is removably secured to the filter cartridge end plate 42 in a manner previously described.

At the same time the motor 38 is energized, air will be supplied to the air pipes 54,55 from a pressurized air source 110 and a control therefor (not shown) in response to a control signal from the pressure sensor 84. The pressurized air supplied to the air pipes 54,55 enters the nozzle 50 through conduits 53 from whence it is directed through the nozzle slot 52 through a narrow segment of the filter cartridge in a direction opposite to the normal flow of air through the filter cartridge. Dirt collected on the surfaces of the filter media is thus back flushed and collected by the dust collecting boot 85 from whence it passes outwardly from the filter housing 12 through the dirt outlet port 86 into a dirt collection receptacle 87, or into the atmosphere if dirt collection receptacle is not needed. As the filter cartridge rotates, successive segments of the filter media will be back flushed until the entire filter media has been back flushed after one complete revolution.

It is to be understood that the filter will continue to supply clean air to the engine through the portion of the filter media that is not being back flushed.

The number of revolutions of the filter cartridge required to clean the filter may be determined experimentally and the motor may be turned off upon completion of the predetermined number of revolutions. Alternatively, the motor may be turned off by a signal from the pressure sensor 84 when the pressure differential across the filter media is reduced to a predetermined level.

If the filter cartridge is to be rotated manually through a hand crank and flexible cable, the operator will be made aware of the need for cleaning the filter by observing a pressure gauge 88 connected to the pressure sensor port 83.

Figure 10:
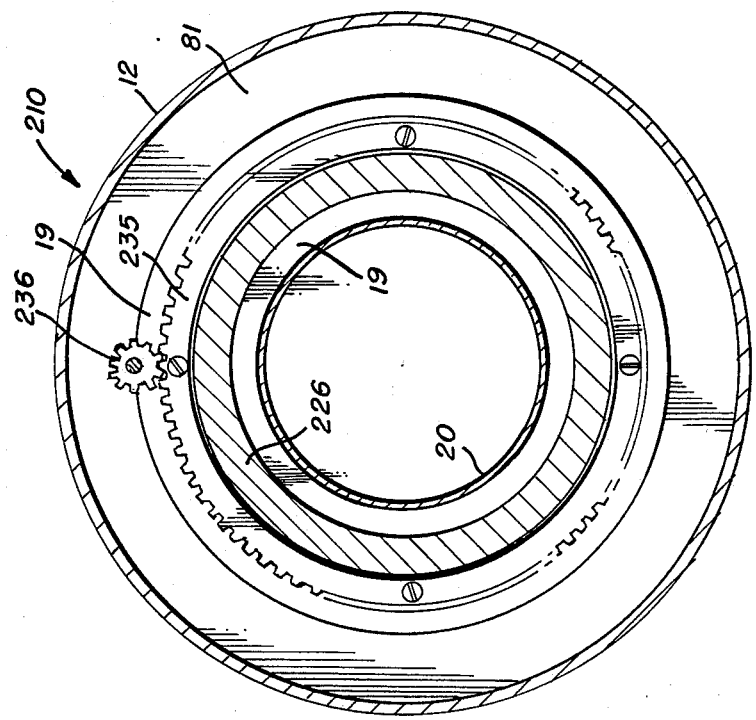
FIG. 10 is a vertical cross-sectional view of the invention taken on line 10—10 of FIG. 9.
Figure 9:
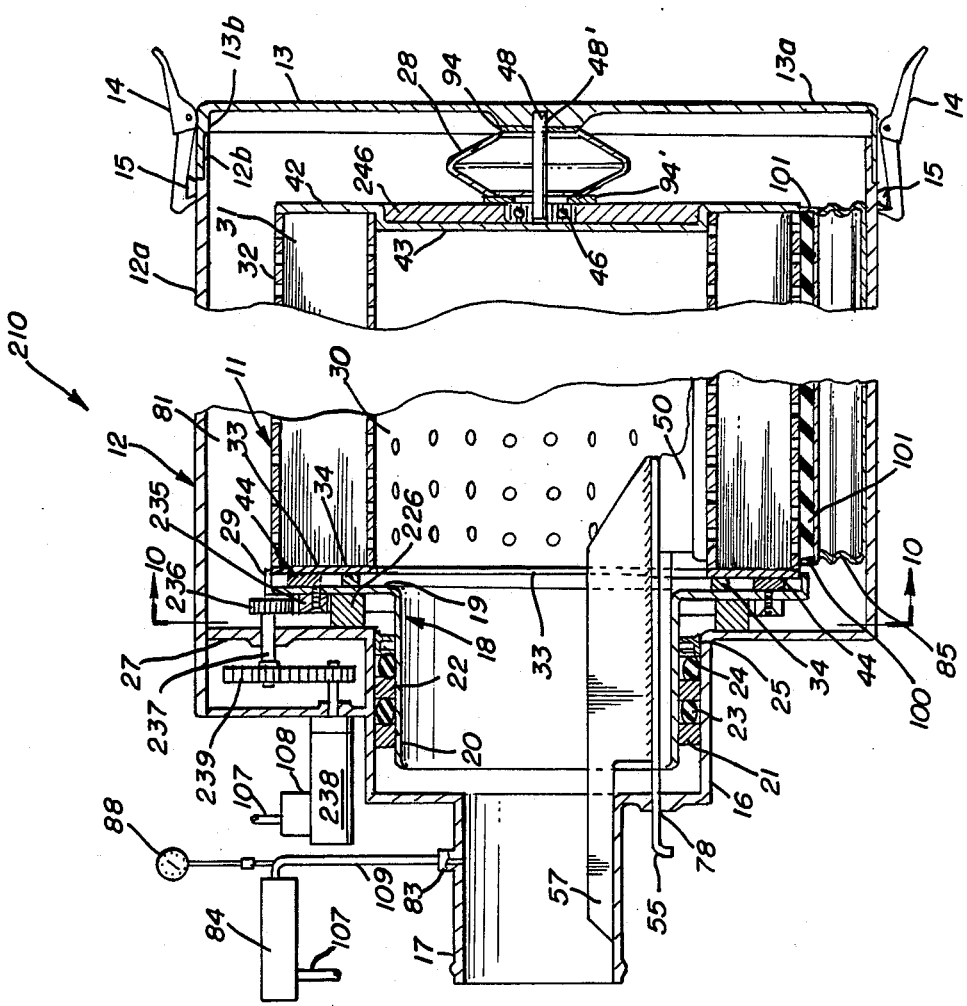
FIG. 9 is a vertical cross-sectional view, similar to FIG. 3, of a second embodiment of the invention with the central portion of the filter broken away.

A second and preferred embodiment of the invention is shown in FIGS. 9 and 10 of the drawings. The self-cleaning air filter 210 shown in FIGS. 9 and 10 differs from the self-cleaning air filter 10 of FIGS. 1-8 primarily in the repositioning of the means for driving the filter cartridge 11 from the cover end of the filter housing to the opposite end of the filter housing. The aforesaid change makes it easier to remove the filter housing end cover and to replace a filter cartridge when necessary without the encumbrance of the drive motor located on the cover and the necessity to re-engage the drive pinion 36 with the ring gear 35 at the cover end of the filter cartridge.

In the drawing and description of the second embodiment 210, the same numerals used in identifying like parts in the first embodiment 10 have been used, and only those parts which differ from parts found in embodiment 10 and parts which have been relocated will be given a different number.

The self-cleaning air filter 210 like the self-cleanig air filter 10 includes a filter cartridge 11 which is rotatably and removably mounted within an external filter housing 12. Structural details of the filter cartridge 11, the housing 12 and of all interior and exterior parts are the same in embodiment 210 as in embodiment 10, unless hereafter described, and a description of the similar structural details may be found by referring back to the description in the specification with respect to embodiment 10 of like numbered parts.

FIG. 9 is a view of the self-cleaning air filter 210 similar to the view of the self-cleaning air filter 10 shown in FIG. 2 except that in FIG. 9 the center longitudinal portion of the embodiment 210 has been broken out. It will be understood that the center portion of the self-cleaning air filter 210 which has been broken out in FIG. 9 is the same as the center portion of embodiment 10 which is shown in FIG. 2, and includes the air intake port 80 and dirt outlet port 86, with or without dust collection bag 87 as may be desired.

Looking at the left-hand side of FIG. 9, the turntable 18 is shown mounted in the outlet end of the filter housing 12 in the same manner as is shown in FIG. 2 for embodiment 10, except that greater space has been provided between the turntable annular plate 19 and the end wall 27 of the housing. An annular Teflon wear strip 226 of sufficient thickness to bridge the space between the plate 19 and end wall 27 serves as a thrust bearing in the same manner as the wear strip 26 of embodiment 10.

The turntable 18 has an external ring gear 235 secured to the outside surface of the annular plate 19 coaxially with the cylindrical neck 20 of the turntable. The ring gear is engaged by a pinion gear 236 mounted on the inner end of shaft 237 extending through an aperture in the end wall 27 of the housing 12 from speed reducer 239 mounted externally of the end wall 27 by welding or other suitable securing means. An electric or fluid operated motor 238 is mounted exteriorly of the speed reducer 239 in driving relationship thereto. The motor 238 when energized will rotate the turntable 18 through the speed reducer 239, pinion gear 236 and ring gear 235.

Rotation of the turntable 18 will rotate the filter cartridge 11 which is pressed against the turntable by the belleville spring 28 at the cover end of the housing. As previously described with respect to embodiment 10, the turntable flange 29 makes frictional contact with the filter cartridge which is usually sufficient to impart rotation to the filter cartridge when the turntable is rotated. In order to further assure driving engagement between the turntable 18 and the filter cartridge 11, magnets 244 are secured to the end cover 33 of the filter cartridge in a circular array, by adhesive or other means, which are attracted magnetically to the annular metal plate 19 of the turntable.

The end of the filter cartridge 11 at the cover end of the self-cleaning air filter 210 is supported by a circular disk or hub 246 which snugly fits in the recessed portion 43 of the filter cartridge end cap 42. The disk 246 has a central radial bearing 46 which is rotatably mounted on the short shaft 48. The shaft 48 is secured in the central opening 48' of the housing cover 13 and projects inwardly therefrom in the same manner as described with respect to embodiment 10, previously described. A belleville spring 28, surrounding the shaft 48, presses against the inside surface of cover 13 at its one end and against the disk 246 at its other end thereby biasing the filter cartridge 11 against the turntable 18 when the housing cover 13 is clamped in place on the housing body 12.

Removal of the housing cover 13, upon release of clamps 14 from lugs 15, permits separation of the hub 246 from the filter cartridge end cap 42. The filter cartridge 11 can then be removed from the filter housing merely by pulling the cartridge outwardly through the open end of the housing.

When a new filter cartridge is to be inserted in the housing 12 of the self-cleaning air filter 210, it is inserted through the open end of the housing 12 when the cover 13 is removed and is pressed inwardly against the turntable 18 making sure that the inner end of the cartridge 13 is axially aligned with the turntable so that the inner end is received within the circular flange 29.

The cover 13 is then replaced on the housing 12 making sure that the support disk 246 is in place on the short shaft 48, and that the support disk 246 is received in the recessed portion 43 of the filter cartridge 11.

The self-cleaning air filter 210 operates in the same manner described with respect to the self-cleaning air filter 10 and further explanation is not believed to be required.

If continuous back flushing of the air filter is desired, or necessary, the filter cartridge 11 may be rotated continuously by continously energizing the motor 38 or 238, depending up the embodiment used, and by continuously supplying air to the air nozzle 50. Normally intermittent or periodic back flushing will be sufficient for efficient operation of the filter and of the equipment dependent upon clean air supplied through the filter.

While in the foregoing there have been described and shown preferred embodiments of the invention, various modifications and equivalents may be resorted to within the spirit and scope of the invention as claimed.

What is claimed is:

1. A self-cleaning air filter comprising a tubular housing,
    an annular filter cartridge removably and rotatably supported in said tubular housing, said filter cartridge having a central opening, a closed end and an open end,
    a removable cover at one end of said housing which provides access into the housing for the insertion and removal of said filter cartridge,
    first and second successively smaller diameter tubular extensions connected coaxially and in series at the other end of said housing and projecting outwardly therefrom, said extensions providing an outlet passage for clean air passing from said filter, an unfiltered air inlet passage into said tubular housing, a rotary support for the open end of said filter cartridge comprising a turntable mounted inside said housing by a tubular neck which is journaled inside of the first of said tubular extensions, said turntable having a peripheral flange which frictionally engages said filter cartridge at said open end, a rotary support for the closed end of said filter cartridge mounted on said removable cover and frictionally engaging the closed end of said filter cartridge when said cover is closed, an elongated air nozzle means adjustably supported inside of said filter cartridge within said central opening for back flushing said filter cartridge, elongated support means for said air nozzle mounted in said second extension and extending into said central opening of said filter cartridge through the tubular neck of said turntable, said support means including guide means for guiding movement of said nozzle in a radial direction with respect to said annular filter and means for biasing said nozzle radially outwardly within said central opening, means for supplying pressurized air to said air nozzle, means disposed opposite said air nozzle between said housing and said filter cartridge for collecting dirt dislodged from said filter cartridge by air from said nozzle passing outwardly through said filter cartridge while back flushing same, a dirt outlet passage through said housing communicating with said means for collecting dirt, and drive means connected to one of said rotary supports for rotating same and transmitting rotation to said filter cartridge.

2. The self-cleaning air filter of claim 1 together with means interposed between said removable cover and said rotary support for said closed end for biasing said rotary support for said closed end and said filter cartridge against said turntable.

3. The self-cleaning air filter of claim 1 wherein said rotary support for the closed end of said filter includes a short shaft mounted coaxially within said cover and a hub assembly rotatably and slidably mounted on said shaft, said hub assembly and said closed end of said filter cartridge having means for centering said hub assembly coaxially with said filter cartridge and providing frictional contact between said hub assembly and said closed end.

4. The self-cleaning air filter of claim 3 together with means interposed between said removable cover and said hub assembly for biasing said hub assembly and said filter cartridge against said turntable.

5. The self-cleaning air filter of claim 3 wherein said drive means comprises a ring gear mounted on said hub assembly, a rotary motor mounted on said cover, and means for transmitting rotary motion from said motor to said ring gear, said latter means including a pinion gear rotatably mounted on a shaft extending inwardly from said cover in a position to engage with said ring gear when the cover is applied to said housing, and to disengage said ring gear when the cover is removed from said housing and gear mechanism transmitting rotary motion of said motor to the shaft on which the pinion gear is mounted.

6. The self-cleaning air filter of claim 1 wherein said drive means is connected to said rotary support for said closed end of said filter cartride.

7. The self-cleaning air filter of claim 1 wherein said drive means includes a rotary electric motor and means for transmitting the rotary motion of said electric motor to one of said rotary supports.

8. The self-cleaning air filter of claim 1 wherein said drive means includes a rotary fluid motor and means for transmitting the rotary motion of said rotary fluid motor to one of said rotary supports.

9. The self-cleaning air filter of claim 1 wherein said drive means is connected to said rotary support for said open end of said filter cartridge.

10. The self-cleaning air filter of claim 9 wherein said drive means comprises a ring gear mounted on said turntable coaxially therewith, a rotary motor, means mounting said rotary motor on said housing and gear mechanism interconnecting said motor and said ring gear for transmitting rotary motion of said motor to said ring gear for rotating said turntable.

11. The self-cleaning air filter of claim 1 wherein said annular filter cartridge comprises an annular filter element surrounding said central opening, a closed circular end cap secured to and covering said annular filter element at said closed end, and an open circular end cap secured to and covering said annular filter element at said open end, said open and closed end caps being made of material attracted to magnets, and magnets secured to said turntable for magnetically attracting said open end cap of said annular filter cartridge toward said turntable.

12. The self-cleaning air filter of claim 11 wherein an annular seal means is mounted on said turntable for sealing engagement with said open end cap.

13. The self-cleaning air filter of claim 11 wherein said rotary support for said closed end of said filter cartridge includes magnetic means secured thereto for attracting and holding said closed end cap of said filter cartridge.

14. The self-cleaning air filter of claim 1 wherein said elongated air nozzle means comprises an elongated hollow tube extending substantially the length of said annular filter cartridge, an elongated air discharge slot formed in said hollow tube for substantially the length of said hollow tube, at least one air supply conduit connected to said hollow tube and resilient seal means surrounding said elongated air discharge slot for making sealing contact with said annular filter cartridge inside of said central opening.

15. The self-cleaning air filter of claim 14 wherein said resilient seal means comprises an elongated resilient seal pad having an elongated slot substantially coextensive with said nozzle air discharge slot and a pad holder for said resilient pad formed on said nozzle about said air discharge slot, said pad being secured in said pad holder.

16. The self-cleaning air filter of claim 1 wherein said means disposed opposite said air nozzle between said housing and said filter cartridge for collecting dust comprises an elongated open top receptacle having a bottom with encompassing side and end walls, said side and end walls being expandable and contractible relative to said bottom, an opening in said bottom, collar means joined to said bottom and encompassing said bottom opening for connecting said elongated dust collecting receptacle in communication with said dirt outlet passage through said housing, elongated seal means joined to said side and end walls opposite said bottom for sealing said dust collecting receptacle to said annular filter cartridge in sliding contact therewith, and means mounted inside said housing for biasing said elongated seal means toward said annular filter cartridge, said elongated seal means for said dust collecting receptacle having an elongated slot extending therethrough opposite said air nozzle and opening into said dust collecting receptacle.

17. The self-cleaning air filter of claim 16 wherein said side and end walls are of flexible bellows type construction.

18. A self-cleaning air filter comprising a filter housing having a tubular body, a cover removably secured to one end of said body, latch means releasably securing said cover to said one end of said body, a first end wall connected to said tubular housing body at the end thereof opposite said removable cover, said first end wall having a central opening therein, a first tubular extension joined to said first end wall about said central opening in said first end wall and projecting outwardly therefrom, a second end wall connected to the end of said first extension opposite said first end wall, said second end wall having a central opening therein, a second tubular extension joined to said second end wall about the central opening therein and projecting outwardly therefrom, said first and second tubular extensions being coaxial with said tubular body and said second extension being of smaller diameter than said first extension, said extensions providing the outlet conduit for filtered air from said filter, an air inlet passage into said housing,

- a cylindrical filter cartridge removably and rotatably mounted in said housing, said filter cartridge having a perforated central tube, an annular filter media surrounding said central tube, an outer foraminous member surrounding said annular filter media and a pair of end caps secured to opposite ends of the filter cartridge, one of said end caps having a central opening therein to provide an outlet passage from one end of said perforated central tube, the other end cap being closed and having a central recess fitted snuggly in the other end of said central tube,
- a first rotary support means within said housing adjacent said one end wall for rotatably supporting one end of said filter cartridge, said rotary support means comprising a turntable having a circular plate with a central opening therein and a tubular neck joined to said plate about said central opening, radial bearing means mounted in said first extension for rotatably supporting said tubular neck in said first extension coaxially therewith, said circular plate being supported by said neck inside said housing adjacent to and substantially parallel to said first end wall, annular thrust bearing means secured to said first end wall for spacing said circular plate from said first end wall, said circular plate having an annular peripheral flange means for snuggly encompassing one end of said filter cartridge,
- a second rotary support means for rotatably supporting the other end of said filter cartridge, said second rotary support means being removably secured to the other end of said cartridge and being associated with said removable cover, said second rotary support means including a central aperture in said cover, a short shaft secured in said central aperture of said cover and projecting axially inwardly of said housing body when the cover is secured to said one end of said housing, a hub assembly rotatably mounted on the inner end of said short shaft, hub assembly centering means projecting into the recess of said closed end cap for centering said hub coaxially with said end cap, means for releasably securing said hub assembly to said closed end cap, resilient means interposed between said cover and said hub assembly for biasing said hub assembly and said filter cartridge toward said turntable,
- annular seal means secured on the circular plate of said turntable to prevent air flow between said circular plate and the end of said filter cartridge supported thereon;
- drive means for rotating one of said first and second rotary support means and thereby imparting rotation to said filter cartridge,
- an elongated air nozzle adjustably supported inside of said filter central tube of said filter cartridge for directing pressurized air radially outwardly through said filter cartridge to back flush same, said nozzle means having a closed back and a slotted open front adjacent the inner surface of said central tube,
- a source of air pressure supplying air to said nozzle,
- elongated cantilever support means fixed at one end inside of said second extension and extending through the neck of said turntable into the interior of said central tube,
- a plurality of saddle brackets supported at longitudinally spaced intervals on said cantilever support means inside of said central tube of said filter cartridge, said saddle brackets extending transversely over the back of said nozzle,
- a spring supported by each of said saddle brackets, each spring bearing against the back of said nozzle and biasing the front of said nozzle radially outwardly of said central tube,
- an elongated nozzle seal means interposed between the open front of said nozzle and the inside of said perforated central tube, said nozzle seal means surrounding the slotted open front of said nozzle for limiting air flow from said nozzle to a direction substantially radially outwardly from said nozzle through said perforated central tube,
- dust collecting means mounted opposite said nozzle in the space between the tubular body of said housing and said filter cartridge for collecting dust dislodged from said filter cartridge by air from said nozzle passing outwardly through said filter cartridge while back flushing same,
- a dust discharge passage through said housing communicating with said dust collecting means for passing dust from said dust collecting means to the outside of said housing,
- means for energizing said drive means for rotating said filter cartridge when back flushing is required, and air control means for supplying air from said air pressure source to said nozzle when said means for rotating said filter cartridge is energized.

* * * * *